(12) United States Patent  
Chen et al.

(10) Patent No.: US 7,586,287 B2
(45) Date of Patent: Sep. 8, 2009

(54) COMPUTER HOUSING TEMPERATURE CONTROL DEVICE

(75) Inventors: Chen-Wei Chen, Chung-Ho (TW); Kuo-Hwa Huang, Chung-Ho (TW)

(73) Assignee: Cooler Master Co., Ltd., Taipei Hsien (TW)

( * ) Notice: Subject to any disclaimer, the term of this patent is extended or adjusted under 35 U.S.C. 154(b) by 214 days.

(21) Appl. No.: 11/715,483

(22) Filed: Mar. 8, 2007

(65) Prior Publication Data

US 2008/0056689 A1 Mar. 6, 2008

(30) Foreign Application Priority Data

Sep. 1, 2006 (TW) .............................. 95215629 U

(51) Int. Cl.
*H02P 27/04* (2006.01)
(52) U.S. Cl. .................... 318/811; 318/599; 318/812
(58) Field of Classification Search .................. 318/599, 318/811
See application file for complete search history.

(56) References Cited

U.S. PATENT DOCUMENTS 7,375,486 B2 * 5/2008 Ku et al. ..................... 318/599
7,455,103 B2 * 11/2008 Sato et al. ................... 165/299

* cited by examiner

*Primary Examiner*—Bentsu Ro
*Assistant Examiner*—Erick Glass
(74) *Attorney, Agent, or Firm*—WPAT., P.C.; Justin King

(57) ABSTRACT

A computer housing temperature control device is disclosed. The present invention obtains the PWM signal generated from the CPU in the motherboard to control the rotation speed of all cooling fans located in the computer housing. Furthermore, the present invention uses a hub to share the PWM signal to all cooling fans in the computer housing, and the PWM signals are displayed on a screen in a digital or analog way. The PWM signal is issued by the motherboard according to the temperature of the CPU, and is used for controlling the rotation speed of the cooling fan so that the temperature of the computer housing is controlled well, and the user is informed of status of the computer.

7 Claims, 3 Drawing Sheets

COMPUTER HOUSING TEMPERATURE CONTROL DEVICE

BACKGROUND OF THE INVENTION

1. Field of the Invention

The present invention relates to a computer housing temperature control device. In particular, this invention relates to a computer housing temperature control device that uses the PWM signal outputted from the central processing unit to control a plurality of coolers.

2. Description of the Related Art

As semiconductor technology has developed, the dimension of integrated circuits (IC) has become smaller whilst their operating speed has increased. When the circuit is operating, the temperature of the electronic components in the circuit rises. Specifically, as the operating speed of the components in ICs becomes higher and higher, a greater amount of heat is generated.

The heat in the computer housing is mainly generated by the CPU. The CPU is the most important element in the computer. It processes a large amount of data, and its operating speed is the fastest of all the components in the computer. Therefore, most of the heat is generated by the CPU. Therefore, it is necessary to monitor the temperature of the CPU in the computer housing, and deal with any over-heating conditions that arise.

In a normal computer housing, there is a simple cooling fan which conducts heat. When the computer turns on, the cooling fan operates continuously. Even though the computer may enter a power-saving mode, the cooling fan still operates at its maximum power. It consumes power, and does not meet the trend towards low-power consuming devices.

In order to overcome the above drawback, the motherboard, produced by Intel can output a corresponding PWM signal according to the temperature of the CPU. The PWM signal is used for controlling the rotation speed of the cooling fan. Thereby, the temperature of the CPU is controlled. However, the PWM signal generated from the Intel motherboard is only used for controlling the rotation speed of the cooling fan for the CPU. There still are other heat sources in the computer housing. By using the above method, the temperature of the computer housing cannot be controlled well.

SUMMARY OF THE INVENTION

One particular aspect of the present invention is to provide a computer housing temperature control device. The present invention uses the PWM signal generated from the CPU in the motherboard to control the rotation speed of all cooling fans located in the computer housing.

The computer housing temperature control device is installed in a computer housing and obtains a primary PWM signal generated from the CPU in the motherboard. The computer housing temperature control device includes a hub coupled with the CPU, at least one cooler coupled with the hub, and a screen coupled with the hub. The hub receives the primary PWM signal and outputs a plurality of secondary PWM signals. The coolers are individually controlled by the secondary PWM signals for adjusting the temperature of the computer housing. The secondary PWM signals are displayed on the screen in a digital or analog way.

The present invention obtains the PWM signal from the CPU and shares the PWM signal to all cooling fans. The PWM signal is used for controlling the rotation speed of all cooling fans. Furthermore, the present invention uses a screen to display the PWM signal.

In this embodiment, the hub of the present invention includes a voltage level converting unit, at least one PWM signal buffer, and at least one signal output socket. The voltage level converting unit converts a high level primary PWM signal into a low level primary PWM signal, and outputs the low level primary PWM signal. The PWM signal buffers are coupled with the voltage level converting unit, and receive the low level primary PWM signal and individually output the secondary PWM signals. The signal output sockets are individually coupled with the PWM signal buffers and the coolers. The hub further includes a variable output voltage regulating unit and a rotation speed signal selecting unit. The variable output voltage regulating unit is coupled with the signal output sockets for regulating a stable voltage and outputting the stable voltage. The rotation speed signal selecting unit is coupled with the signal output sockets for receiving the secondary PWM signals and outputs one of the secondary PWM signals.

In another embodiment, the hub is composed of at least one Y-shaped connecting pin connected in serial. The Y-shaped connecting pin includes a signal input terminal coupled with the CPU for receiving the primary PWM signal, a conducting wire, and two signal output terminals coupled with the signal input terminal via the conducting wire. The two signal output terminals respectively output the secondary PWM signal.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
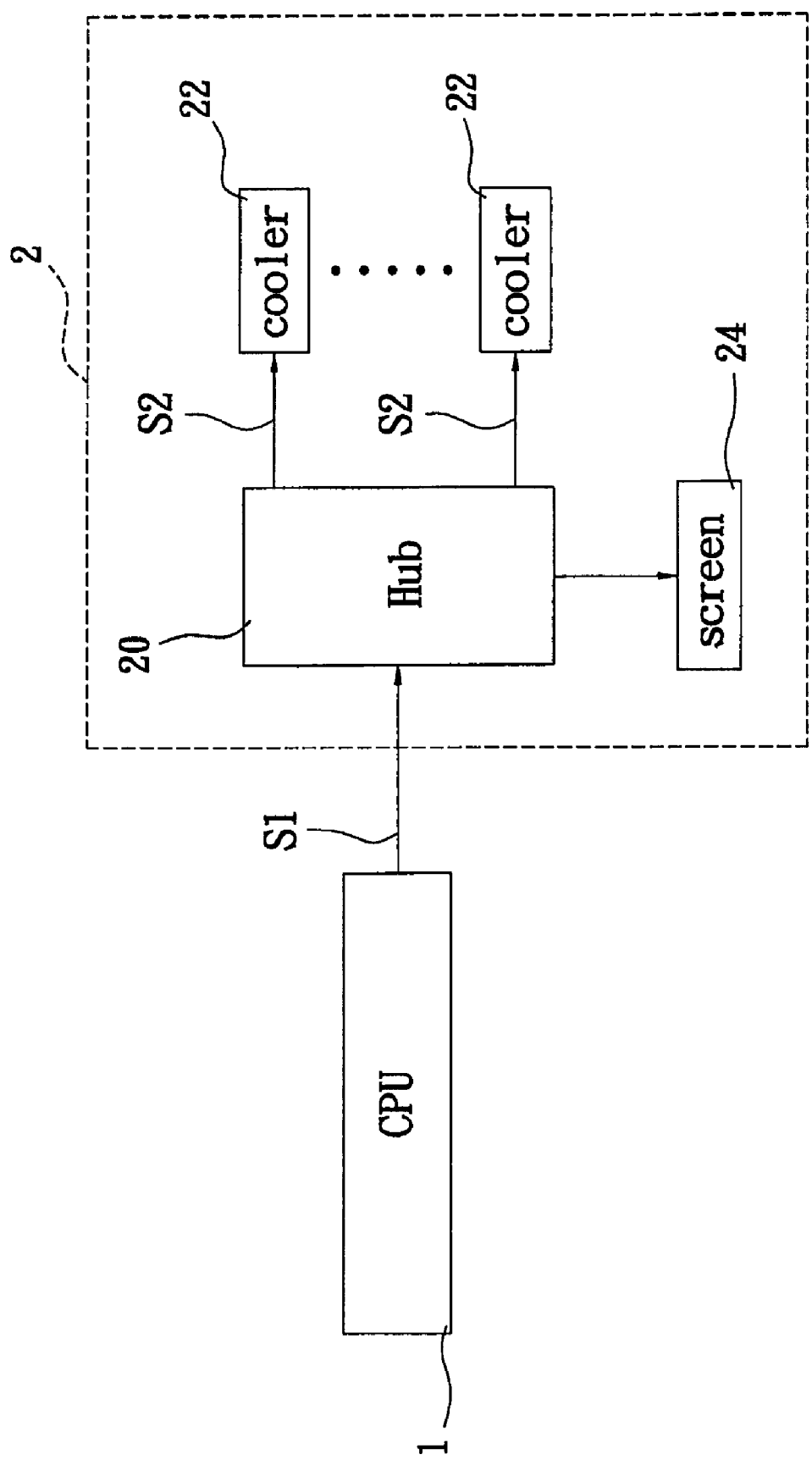
FIG. 1 is a block diagram of the computer housing temperature control device of the present invention.

Reference is made to FIG. 1, which shows a block diagram of the computer housing temperature control device of the present invention. The computer housing temperature control device 2 is installed in a computer housing (not shown in the figure) and obtains a primary PWM signal S1 outputted from the CPU 1 on the motherboard (not shown in the figure). The computer housing temperature control device 2 includes a hub 20, at least one cooler 22, and a screen 24.

The hub 20 is coupled with the CPU 1. The hub 20 receives the primary PWM signal S1 and outputs a plurality of secondary PWM signals S2. The coolers 22 are coupled with the hub 20. The coolers 22 are individually controlled by the secondary PWM signals S2 for adjusting the temperature of the computer housing. The screen 24 is coupled with the hub 20, and the secondary PWM signals S2 are displayed on the screen 24 in a digital or analog way. The present invention can display the secondary PWM signals S2 on the screen 24.

Reference is made to FIG. 1 again. The duty cycle of the primary PWM signal outputted from the CPU 1 changes as the temperature of the CPU 1 changes. The hub 20 extends the primary PWM signal S1 into a plurality of secondary PWM signals S2 so that their waveforms are the same as each other. Therefore, the duty cycle of the secondary PWM signal also changes as the temperature of the CPU 1 changes. Thereby, the plurality of secondary PWM signals S2 can be used for controlling a plurality of coolers 22 according to the temperature of the CPU 1 so that the temperature of the computer housing is controlled well.

Reference is made to FIG. 1 again. The cooler 22 is a cooling fan. The cooling fan can be a computer housing fan, a power supply fan, a display card fan, or a motherboard fan, etc. Therefore, when the plurality of cooling fans are installed in the computer housing (such as a computer housing fan, a power supply fan, a display card fan, or a motherboard fan, etc.), the cooling fans are controlled by the secondary PWM signals S2 and change their rotation speed according to the temperature of the CPU 1 so as to adjust the temperature of the computer housing. The cooler 22 can also be a cooler pump that can be controlled by a PWM signal. Similarly, the cooler pump is also controlled by the secondary PWM signal S2 to adjust the temperature of the computer housing.

Reference is made to FIG. 1 again. When the temperature of the CPU 1 represented by the primary PWM signal S1 is too high, the hub 20 converts the primary PWM signal S1 into the secondary PWM signals, and shares the secondary PWM signals S2 to all coolers 22 in the computer housing. The shared secondary PWM signals S2 change the current of the coolers 22 to increase the rotation speed of the coolers 22 in the computer housing. Thereby, the efficiency of conducting heat is substantially enhanced so that the temperature of the computer housing is controlled within an acceptable range.

Furthermore, when the temperature of the CPU 1 represented by the primary PWM signal S1 is normal, the hub 20 converts the primary PWM signal S1 into the secondary PWM signals, and shares the secondary PWM signals S2 to all coolers 22 in the computer housing. The shared secondary PWM signals S2 also changes the current of the coolers 22 to decrease the rotation speed of the coolers 22 in the computer housing. Thereby, the efficiency of conducting heat recovers to its normal value so that the loading of the cooling fan motor is decreased, power consumption is lowered, and the noise of the fan is also reduced.

Figure 2:
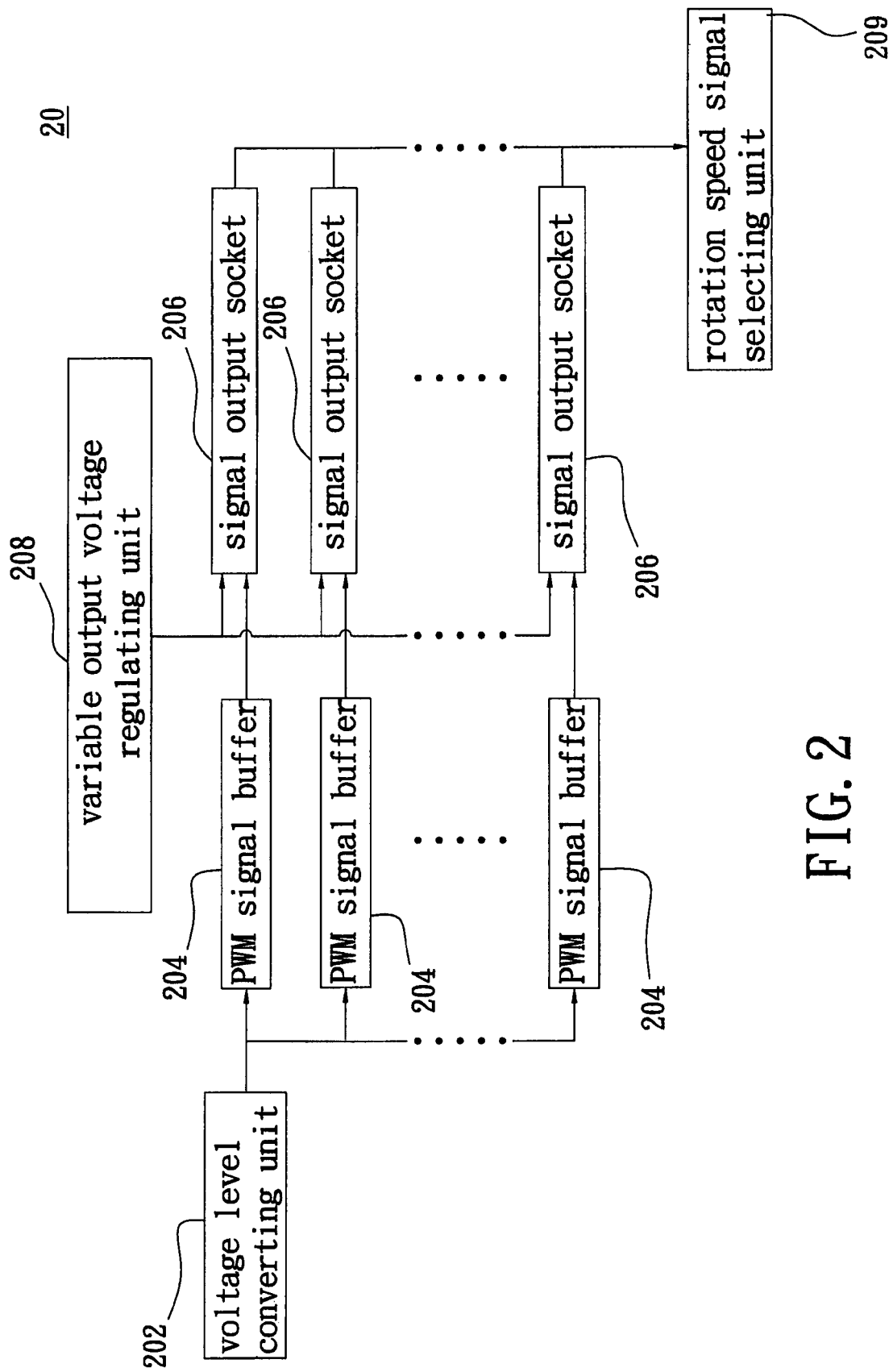
FIG. 2 is a block diagram of the hub of the first embodiment of the present invention.

Reference is made to FIGS. 1 and 2. FIG. 2 shows a block diagram of the hub of the first embodiment of the present invention. The hub 20 includes a voltage level converting unit 202, at least one PWM signal buffer 204, and at least one signal output socket 206, a variable output voltage regulating unit 208, and a rotation speed signal selecting unit 209. The voltage level converting unit 202 converts the primary PWM signal S1 with a voltage level 5V into a primary PWM signal S1 with a voltage level 3.3V, and outputs the primary PWM signal S1. The PWM signal buffers 204 are coupled with the voltage level converting unit 202, and receive the primary PWM signal s1 with a voltage level 3.3V and individually output the secondary PWM signals S2. The PWM signal buffers 204 have a high input impedance and a low output impedance so that the primary PWM signal S1 is fanned out into the plurality of the secondary PWM signals S2 for driving the coolers.

The signal output sockets 206 are individually coupled with the PWM signal buffers 204 and the coolers 22, and act as an interface for transmitting the secondary PWM signals S2 to the coolers 22. The variable output voltage regulating unit 208 is coupled with the signal output sockets 206 for regulating a stable voltage and outputting the stable voltage by cooperating with a power VCC and a variable resistor set VR. The voltage is between 7 and 11 volts. The rotation speed signal selecting unit 209 is coupled with the signal output sockets 206 for receiving the secondary PWM signals S2 and outputs one of the secondary PWM signals S2. The rotation speed signal selecting unit 209 is connected with a screen 24 via an output socket (not shown in the figure) for transmitting one of the secondary PWM signals S2 to the screen 24.

Figure 3:
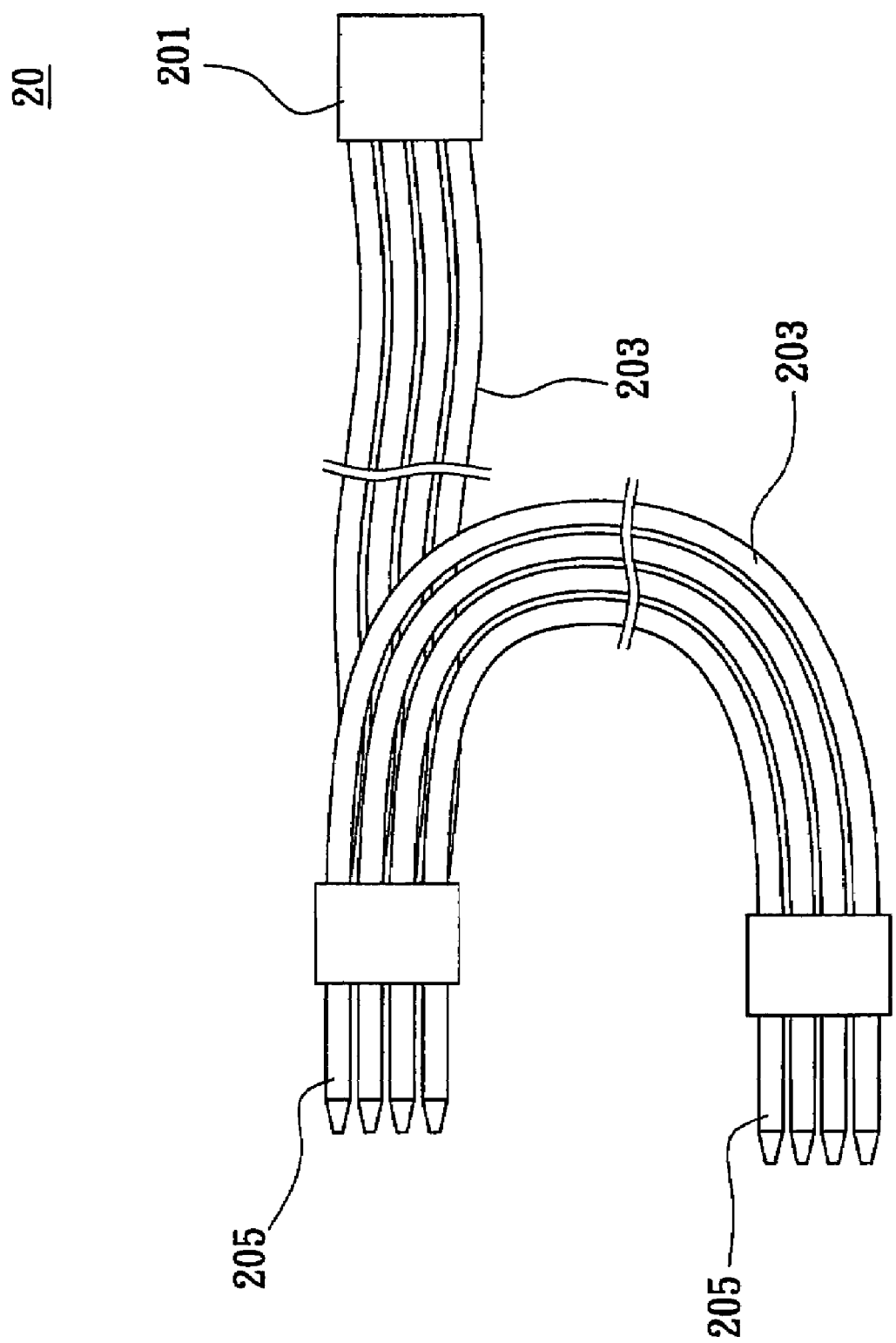
FIG. 3 is a schematic diagram of the hub of the second embodiment of the present invention.

Reference is made to FIGS. 1 and 3. FIG. 3 shows a schematic diagram of the hub of the second embodiment of the present invention. The hub 20 is composed of a plurality of Y-shaped connecting pins connected in serial. The first stage Y-shaped connecting pin receives the primary PWM signal S1 from the signal input terminal 201, and converts into the secondary PWM signal S2 and outputs the secondary PWM signal S to two signal output terminals 205. The secondary PWM signal S outputted from the signal output terminals 205 of the Y-shaped connecting pin is transmitted to a signal input terminal 201 of the next stage Y-shaped connecting pin and becomes a primary PWM signal for the next stage Y-shaped connecting pin. By using the above method, the hub 20 is composed of a plurality of Y-shaped connecting pins that are connected in serial and form a tree structure.

The present invention provides a computer housing temperature control device. The present invention obtains the PWM signal generated from the CPU in the motherboard to control the rotation speed of all cooling fans located in the computer housing. Furthermore, the present invention uses a hub to share the PWM signal to all cooling fans in the computer housing, and the PWM signals are displayed on a screen in a digital or analog way. The PWM signal is issued by the motherboard according to the temperature of the CPU, and is used for controlling the rotation speed of the cooling fan. The duty cycle of the PWM signal is used for controlling the rotation speed of the cooling fan so that the speed is controlled well, and the usage life is lengthened.

Furthermore, the computer housing temperature control device uses a hub to generate and output the plurality of secondary PWM signals. The secondary PWM signals S2 individually control the coolers for adjusting the temperature of the computer housing. Therefore, the present invention solves the heat problem caused by other heat sources to ensure the temperature of the computer housing is maintained at an acceptable level.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A computer housing temperature control device, installed in a computer housing and obtaining a primary PWM signal generated from a CPU in a motherboard, comprising:

a hub coupled with the CPU, wherein the hub receives the primary PWM signal and outputs at least one secondary PWM signal, the hub including:
  a voltage level converting unit for converting a high level primary PWM signal into a low level primary PWM signal;
  at least one PWM signal buffer coupled with the voltage level converting unit, wherein the PWM signal buffer receives the low level primary PWM signal and individually outputs the secondary PWM signals; and
  at least one signal output socket individually coupled with the PWM signal buffers; and
at least one cooler coupled with the signal output socket of the hub, wherein the cooler is controlled by the secondary PWM signals for adjusting the temperature of the computer housing.

2. The computer housing temperature control device as claimed in claim 1, further comprising a screen, wherein the screen is coupled with the hub for displaying the plurality of secondary PWM signals in a digital or analog way.

3. The computer housing temperature control device as claimed in claim 1, wherein the cooler is a cooling fan.

4. The computer housing temperature control device as claimed in claim 3, wherein the cooling fan is a computer housing fan, a power supply fan, a display card fan, or a motherboard fan.

5. The computer housing temperature control device as claimed in claim 1, wherein the cooler is a cooler pump.

6. The computer housing temperature control device as claimed in claim 1, wherein the hub further comprises a variable output voltage regulating unit, wherein the variable output voltage regulating unit is coupled with the signal output socket for regulating a stable voltage and outputting the stable voltage.

7. The computer housing temperature control device as claimed in claim 6, wherein the hub furthermore comprises a rotation speed signal selecting unit, wherein the rotation speed signal selecting unit is coupled with the signal output socket for receiving the secondary PWM signals and outputs one of the secondary PWM signals.

* * * * *